(12) United States Patent
Bucciarelli

(10) Patent No.: US 6,536,741 B2
(45) Date of Patent: Mar. 25, 2003

(54) INSULATING INSERT FOR MAGNETIC VALVES

(76) Inventor: Brian Bucciarelli, 96 Brahma Ave., Bridgewater, NJ (US) 08807

(*) Notice: Subject to any disclaimer, the term of this patent is extended or adjusted under 35 U.S.C. 154(b) by 151 days.

(21) Appl. No.: 09/798,532

(22) Filed: Mar. 2, 2001

(65) Prior Publication Data

US 2002/0121619 A1 Sep. 5, 2002

(51) Int. Cl.[7] .............................................. F16K 31/02
(52) U.S. Cl. ................................................. 251/129.15
(58) Field of Search ....................... 251/129.15; 174/51, 174/52.2, 61

(56) References Cited

U.S. PATENT DOCUMENTS

| | | | | |
|---|---|---|---|---|
| 2,457,002 A | | 12/1948 | Spiro | 217/69 |
| 2,761,112 A | | 8/1956 | Torcivia | 339/92 |
| 2,887,126 A | | 5/1959 | Frantz | 137/625.27 |
| 2,987,909 A | | 6/1961 | Shlank | 70/168 |
| 3,707,040 A | | 12/1972 | Lehmann | 29/628 |
| 3,716,815 A | | 2/1973 | Riches | 339/44 M |
| 3,800,257 A | | 3/1974 | Schmitt | 335/259 |
| 3,909,504 A | * | 9/1975 | Browne | 174/52.2 |
| 4,898,360 A | * | 2/1990 | VonHayn et al. | 251/129.01 |
| 5,386,337 A | * | 1/1995 | Schoettl | 174/52.2 X |
| 5,709,134 A | * | 1/1998 | Ulm | 174/52.2 X |
| 5,821,840 A | * | 10/1998 | Ricker | 335/128 |
| 5,927,482 A | | 7/1999 | Davies | 200/305 |
| 5,941,282 A | * | 8/1999 | Suzuki et al. | 251/129.15 X |
| 6,095,489 A | | 8/2000 | Kaneko et al. | 251/129.15 |
| 6,357,818 B1 | * | 3/2002 | Adams | 174/52.2 X |

* cited by examiner

Primary Examiner—David A. Scherbel
Assistant Examiner—Eric Keasel
(74) Attorney, Agent, or Firm—Roberts & Mercanti, LLP

(57) ABSTRACT

An insulating insert for a magnetic air valve having a metal housing. The insert minimizes electrical contact between the metal housing and wires or other conductive objects contained within the metal housing. The insert comprises an electrically insulating material, and includes an insulating sleeve having side walls, top and bottom opposite open ends, and a threaded bushing attached around a hole through one side wall of the sleeve. The bushing engages a strain relief wire connector or hollow bolt of the magnetic valve, which wire connector contains wires passing into the housing to form electrical connections with the magnetic core of the valve. The insert also preferably includes an insulating flange around the perimeter of the top open end of the sleeve to thereby further insulate the housing, and to provide a seal between the housing and an optional covering.

11 Claims, 3 Drawing Sheets

INSULATING INSERT FOR MAGNETIC VALVES

BACKGROUND OF THE INVENTION

1. Field of the Invention

The present invention relates to magnetic valves. More particularly the invention relates to an insulating insert for magnetic air valves. Such find use in control systems of railroad locomotives.

2. Description of the Related Art

Magnetic air valves, also known as magnet valves, solenoid valves, and electric air valves, are generally well known in the art. Typically such valves and valve assemblies comprise a magnetically energizable core encased in a metal housing having an open front end and a closed rear end. The metal housing usually has an upper front hole having a removable strain relief wire connector or hollow bolt attached therethrough. The such wire connectors typically house wires for actuating the magnetic core inside the housing.

With such magnetic valves, air flow typically occurs only when certain spool valves are open. A plunger, actuated by the magnetic core, is supported in a bore through both the rear of the metal housing and through the magnetic core. The plunger cooperates with a spool valve member to shift the spool valve member upon energizing of the magnetic core from an open to a closed position, or vice versa, as desired. Such valves are commonly used in locomotive control systems.

The problem to be solved is that during actuation of the valve, there are rapidly succeeding shock movements that may vibrate the magnetic valves and the wires therein. With vibration over time, the wires may fray and/or come into contact with the metal walls of the magnetic valve housing, thus shorting out the valve, tripping a control breaker, and shutting down the locomotive.

It would therefore be desirable to provide a device for minimizing electrical contact between the wires and the metal housing of the magnetic valve. The present invention provides a solution to this problem.

The invention comprises an insulating insert for separating wires from an inside metal wall of the magnetic valve housing. The insert comprises an electrically insulating sleeve having side walls, top and bottom opposite open ends, and a threaded bushing attached around a hole through one side wall of the sleeve. The bushing engages a removable, hollow, strain relief wire connector or hollow bolt of the magnetic valve, which wire connector contains wires running into the housing to form the requisite electrical connections with the magnetic core of the valve. The insert also preferably includes an insulating flange around the perimeter of the top open end of the sleeve to thereby further insulate the housing, and to provide a seal between the housing and an optional covering.

SUMMARY OF THE INVENTION

The invention provides an insulating insert for a magnetic valve which comprises:
a) a hollow, electrically insulating sleeve having sidewalls defining a top open end and a bottom open end opposite to the top open end; one of the side walls having a circular hole therethrough; and
b) a threaded bushing fixedly attached to the sidewall around the circular hole.

The invention further provides an insulating insert for a magnetic valve which comprises:
a) a hollow, electrically insulating sleeve having sidewalls defining a top open end and a bottom open end opposite to the top open end; one of the side walls having a circular hole therethrough;
b) a threaded bushing fixedly attached to the sidewall around the circular hole;
c) an electrically insulating flange around a perimeter of the top open end, which flange projects substantially perpendicularly to said sidewalls, and which flange comprises a pair of opposing fastening holes therethrough; and
d) an electrically insulating covering in contact with the flange around the perimeter of the top open end of the sleeve.

The invention still further provides a magnetic valve assembly which comprises:
a) a magnetic valve comprising:
i) a metal housing having a top open end and a bottom closed end, an upper front hole through a front side of the metal housing near the top open end, and two opposing lower holes through opposite front and back sides of the metal housing near the bottom closed end;
ii) a magnetic core having conductive connectors, and a central bore therethrough, which magnetic core is positioned within the bottom closed end of the metal housing such that the conductive connectors face in a direction towards the top open end of the metal housing, and that the central bore of the magnetic core is concentrically aligned with the two opposing lower holes through the opposite front and back sides of the metal housing;
iii) a removable strain relief wire connector positioned through the upper front hole in the metal housing; and
iv) conductive wires electrically attached to the conductive connectors of the magnetic core within the metal housing of the valve, which wires run through the wire connector and out of the magnetic valve; and
b) an insulating insert comprising:
i) a hollow, electrically insulating sleeve having sidewalls defining a top open end and a bottom open end opposite to the top open end; one of the side walls having a circular hole therethrough; and
ii) a threaded bushing fixedly attached to the sidewall around the circular hole;
which insert is positioned within the top open end of the magnetic valve such that the sidewalls of the electrically insulating sleeve are in contact with an inside surface of the metal housing, the strain relief wire connector engages the threaded bushing of the insulating insert within the magnetic valve such that a first end of the wire connector extends into the metal housing while a second end of the wire connector remains outside of the housing, and the conductive wires of the magnetic valve run from the conductive contacts, into the bottom open end of the insulating insert, through the wire connector, and out of the magnetic valve.

The invention still further provides a process for electrically insulating a magnetic valve which comprises:
a) providing a magnetic valve comprising:
i) a metal housing having a top open end and a bottom closed end, an upper front hole through a front side of the metal housing near the top open end, and two opposing lower holes through opposite front and back sides of the metal housing near the bottom closed end;

ii) a magnetic core having conductive connectors, and a central bore therethrough, which magnetic core is positioned within the bottom closed end of the metal housing such that the conductive connectors face in a direction towards the top open end of the metal housing, and that the central bore of the magnetic core is concentrically aligned with the two opposing lower holes through the opposite front and back sides of the metal housing;

iii) a removable strain relief wire connector positioned through the upper front hole in the metal housing; and iv) conductive wires electrically attached to the conductive connectors of the magnetic core within the metal housing of the valve, which wires run through the wire connector and out of the magnetic valve; and b) providing an insulating insert which comprises:
i) a hollow, electrically insulating sleeve having sidewalls defining a top open end and a bottom open end opposite to the top open end; one of the side walls having a circular hole therethrough; and
ii) a threaded bushing fixedly attached to the sidewall around the circular hole; and c) positioning the insulating insert within the top open end of the magnetic valve such that the sidewalls of the electrically insulating sleeve are in contact with an inside surface of the metal housing, the strain relief wire connector engages the threaded bushing of the insulating insert within the magnetic valve such that a first end of the wire connector extends into the metal housing while a second end of the wire connector remains outside of the housing, and the conductive wires of the magnetic valve run from the conductive contacts, into the bottom open end of the insulating insert, through the wire connector, and out of the magnetic valve.

DETAILED DESCRIPTION OF THE PREFERRED EMBODIMENT

The invention provides an insulating insert for a magnetic air valve. Such insulating inserts serve to electrically insulate a magnetic valve and thereby prevent shorting and/or other electrical problems which may result from contact between the magnetic valve and any wires or other electrically conductive objects within the valve.

Figure 1:
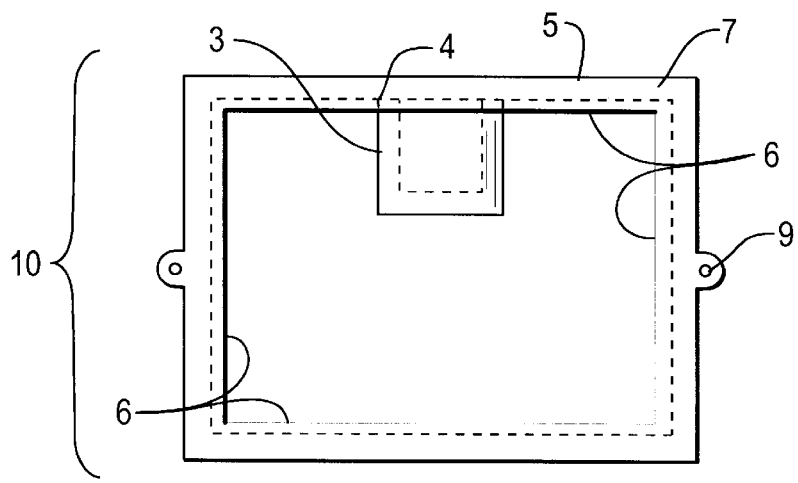
FIG. 1 shows a front view of an insulating insert according to the invention.
Figure 2:
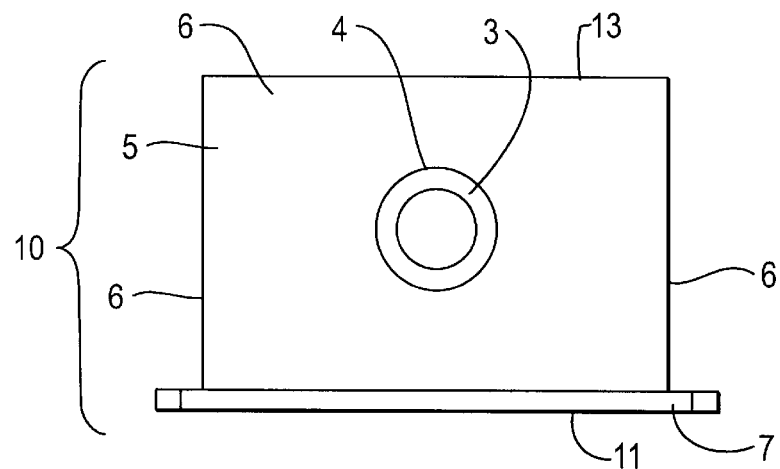
FIG. 2 shows a top view of an insulating insert according to the invention.
Figure 3:
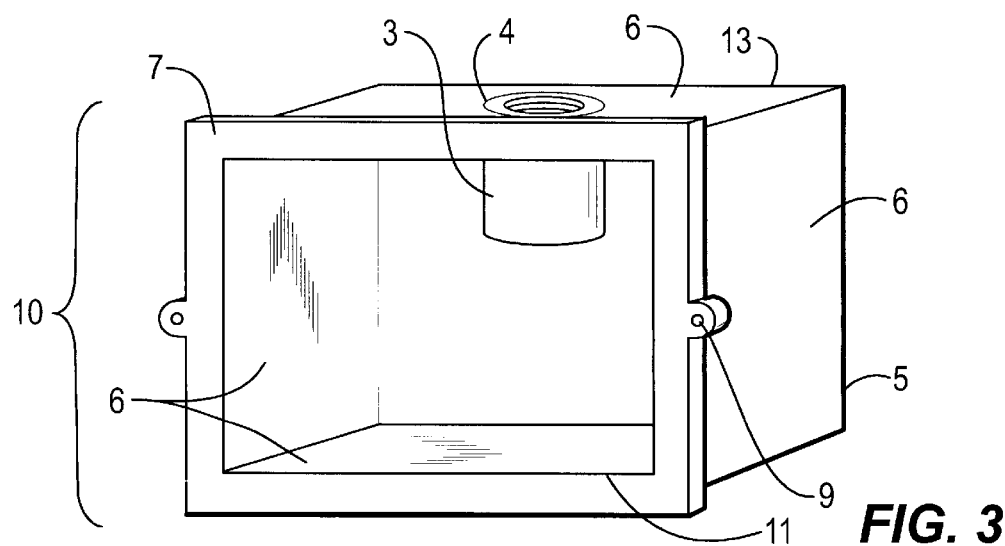
FIG. 3 shows a perspective view of an insulating insert according to the invention.

FIGS. 1–3 show an insulating insert 10 according to the invention. As shown in these Figures, the insert 10 preferably comprises a hollow, electrically insulating sleeve 5 having sidewalls 6 defining a top open end 11 and a bottom open end 13 opposite to the top open end 11. The sleeve 5 is preferably shaped to fit inside a magnetic valve such that the sidewalls 6 of the sleeve 5 are in contact with inner walls of the magnetic valve which typically comprise metal. The sleeve 5 preferably serves to electrically insulate the magnetic valve by preventing contact between inner walls of the magnetic valve with wires or other electrically conductive objects within the valve. The sleeve 5 preferably comprises an electrically insulating material. Suitable electrically insulating materials nonexclusively include homopolymers and copolymers of polyesters, polyolefins, polyurethanes, nylons, polycarbonates, acrylonitriles, dienes, styrene, acrylics, rubbers and combinations thereof.

Preferably, one of the sidewalls 6 has a circular hole 4 therethrough. The insert 10 preferably comprises a threaded bushing 3 fixedly attached to the sidewall 6 around the circular hole 4. The bushing 3 preferably has inner threads, and is capable of engaging threaded objects such as strain relief wire connectors, bolts, and the like. In a preferred embodiment, the bushing 3 is capable of engaging a removable strain relief wire connector of a magnetic valve, as described below, to secure the insert 10 to the magnetic valve. Typical magnet valves often include a nut or lock ring (not shown) to secure such wire connectors or bolts to the valve. Vibrations often cause such nuts or lock rings to become loose, falling into the valve and resulting in shorting. The bushing 3 is preferably fixedly attached to the sleeve 5 to prevent such shorting. Suitable materials for the threaded bushing 3 nonexclusively include electrically insulating materials such as those described above for the electrically insulating sleeve 5. Materials for the threaded bushing are preferably selected independently from those materials used for the electrically insulating sleeve 5 or any other electrically insulating component of the invention.

In a preferred embodiment, the insert 10 further comprises an electrically insulating flange 7 attached around a perimeter of the top open end 11 of the sleeve 5, which flange 7 projects substantially perpendicularly to said sidewalls 6 as shown in FIG. 3. The electrically insulating flange 7 preferably serves to further insulate and protect a magnetic valve from contact with wires and/or other electrically conductive objects, and to provide a seal between the magnetic valve and an optional electrically insulating covering (not shown). The flange 7 preferably comprises an electrically insulating material. Suitable electrically insulating materials nonexclusively include those materials described above for the electrically insulating sleeve 5. Materials for the flange are preferably selected independently from those materials used for the electrically insulating sleeve 5 or any other electrically insulating component of the invention. The flange 7 preferably further comprises a pair of opposing fastening holes 9 therethrough which serves to fasten the insulating insert 10 to a magnetic valve, an electrically insulating covering (not shown) or other object by means of screws.

Figure 4:
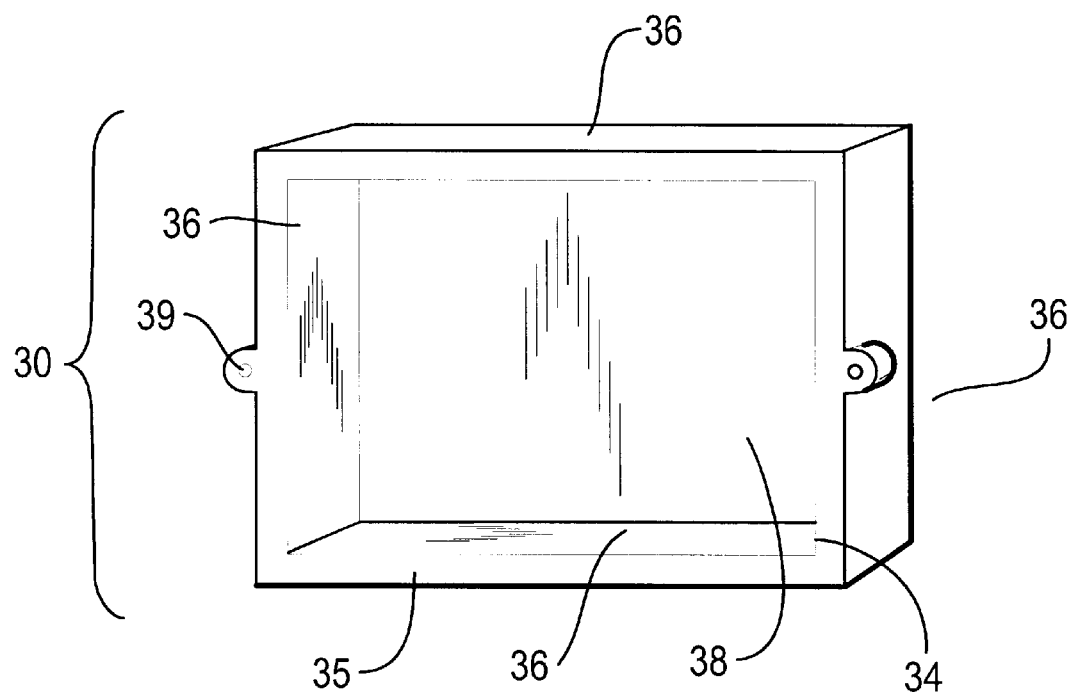
FIG. 4 shows a perspective view of a box shaped electrically insulating covering according to the invention.
Figure 5:
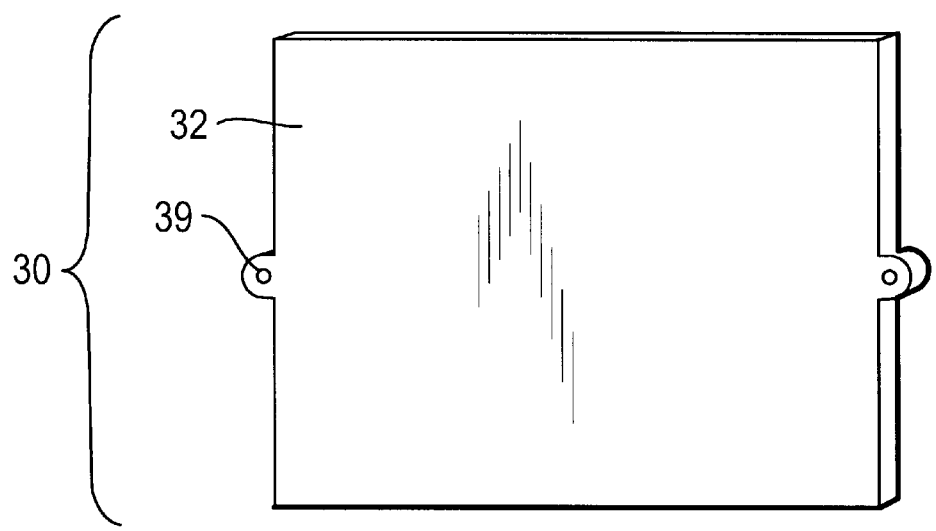
FIG. 5 shows a perspective view of a plate shaped electrically insulating covering according to the invention.

The insert 10 may optionally further comprise an electrically insulating covering. Such electrically insulating coverings 30 may be of any suitable shape such as an open box, shown in FIG. 4, or a plate, shown in FIG. 5. The optional electrically insulating covering 30 serves to further insulate a magnetic valve and its contents from contact with wires and/or other electrically conductive objects, and provides protection against water penetration and the like. This may be done by providing an electrically insulated covering 30 which comprises an electrically insulating material, and which engages the perimeter of the top open end 11 of sleeve 5, or a flange 7 around the perimeter of the top open end 11 of sleeve 5 to thereby cover the top open end 11 of sleeve 5 of the insulating insert 10. FIG. 4 shows one embodiment of a covering 30, wherein the covering is box shaped and comprises sidewalls 36 having an outer surface and an inner insulating surface, a bottom closed end 38 having an outer surface and an inner insulating surface, a top open end 34 opposite the bottom closed end 38, which top open end 34 is surrounded by an insulating perimeter 35. FIG. 5 shows another embodiment of a covering 30, wherein the electrically insulating covering is plate shaped and comprises a flat insulating surface 32. The electrically insulating coverings 30 of FIGS. 4 and 5 preferably comprises a pair of opposing fastening holes 39 therethrough which serve to fasten the covering 30 to a magnetic valve, or to the insulating insert 10 according to the invention. Suitable electrically insulating materials for the optional electrically insulating covering nonexclusively include those materials described above for the electrically insulating sleeve 5. Materials for the electrically insulating covering are preferably selected independently from those materials used for the electrically insulating sleeve 5 or any other electrically insulating component of the invention.

Figure 6:
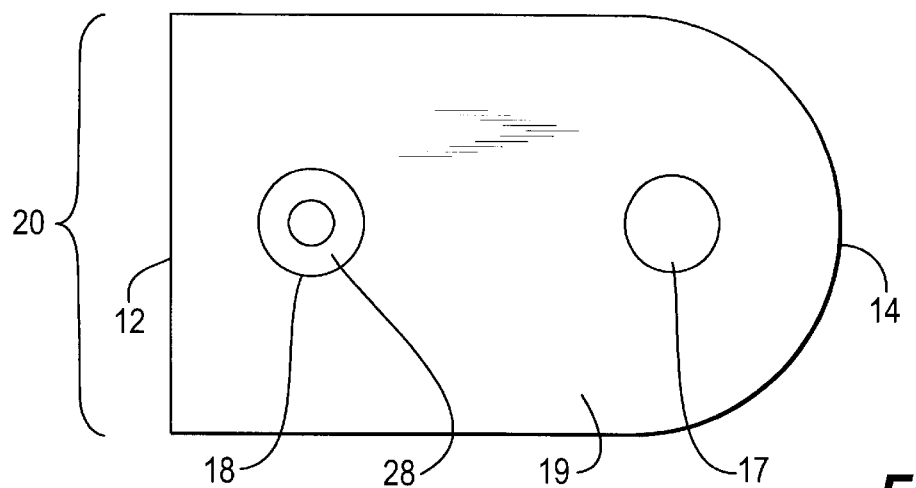
FIG. 6 shows a top view of a magnetic valve housing.
Figure 7:
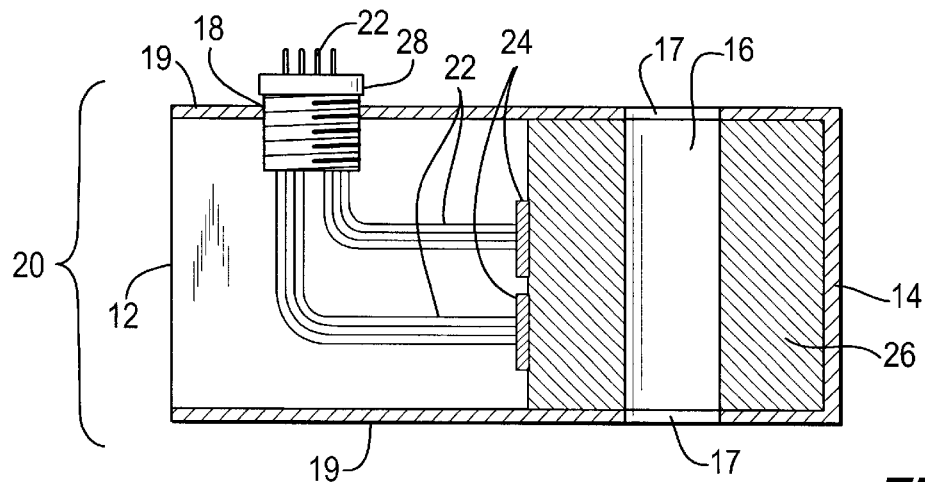
FIG. 7 shows a side cross sectional view of a magnetic valve assembly without an insert according to the invention.

FIGS. 6–7 show a known magnetic valve 20 for use with the present invention. Magnetic valves for use with the present invention may also be referred to as solenoid valves, magnetic air valves, or electric air valves, and are generally well known in the art. Suitable magnetic valves are available commercially from Graham-White of Salem, Va. FIG. 6 shows a top view of a magnetic valve 20 comprising a metal housing 19 having an top open end 12 and a bottom closed end 14. FIG. 6 shows an upper front hole 18 through a front side of the metal housing 19 near the top open end 12. As shown in FIG. 7, the magnetic valve comprises two opposing lower holes 17 through opposite front and back sides of the metal housing 19 near the bottom closed end 14. The magnetic valve 20 further comprises a magnetic core 26 having conductive connectors 24 and a central bore 16 therethrough, which core 26 is positioned within the bottom closed end 14 of the metal housing 19 of valve 20 such that the conductive connectors 24 face in a direction towards the top open end 12 of the metal housing 19, and that the central bore 16 of the magnetic core 26 is concentrically aligned with the two opposing lower holes 17 through opposite front and back sides of the metal housing 19. FIGS. 6 and 7 also show a removable strain relief wire connector 28 which is capable of being inserted through the front hole 18 of the metal housing 19. According to the invention, other threaded objects such as threaded tubes, pipes, hollow bolts, and the like may be used in place of the strain relief wire connector. In a preferred embodiment, the wire connector 28 comprises an electrically insulating material on an inside surface of the wire connector. Suitable electrically insulating materials nonexclusively include those described above for the electrically insulating sleeve 5. As shown in FIG. 7, conductive wires 22 are preferably electrically attached to the conductive connectors 24 of the magnetic core 26 within the metal housing 19 of the valve 20. These wires 22 are preferably capable of running through the strain relief wire connector 28 and out of the valve 20.

Figure 8:
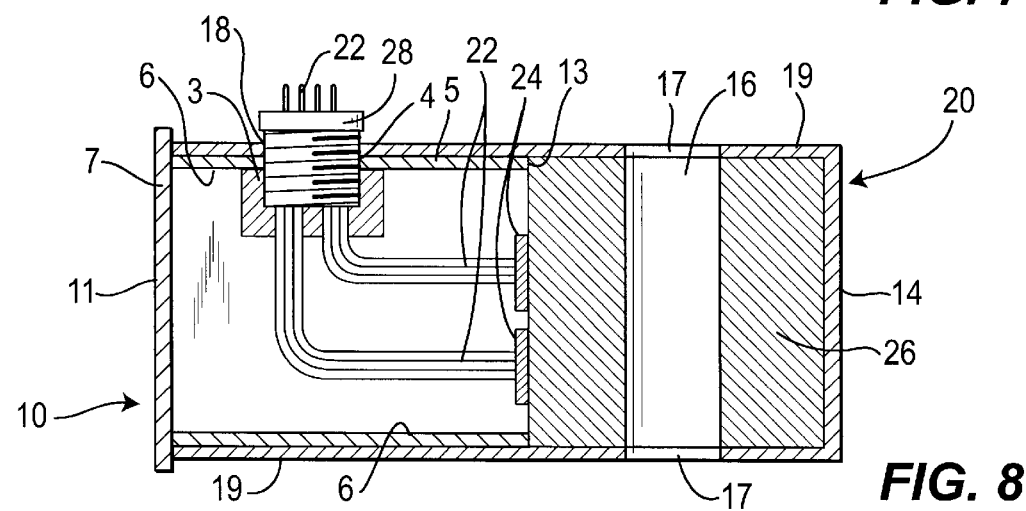
FIG. 8 shows a side cross sectional view of a magnetic valve assembly including an insert according to the invention.

FIG. 8 shows an insulating insert 10 of the invention, in use with a magnetic valve 20. As shown in FIG. 8, an insert 10 according to the invention is positioned within the top open end 12 of the valve 20. The insert 10 is preferably positioned such that the sidewalls 6 of the electrically insulating sleeve 5 are in contact with an inside surface of the metal housing 19 of the valve 20. Preferably, the strain relief wire connector 28 of the magnetic valve 20 engages the threaded bushing 3 of the insulating insert 10 within the magnetic valve 20 such that a first end of the wire connector 28 extends into the metal housing 19 while a second end of the wire connector 28 remains outside of the housing 19. It is also preferred that the conductive wires 22 of the valve 20 run from the conductive contacts 24, into the bottom open end 13 of the insert 10, through the strain relief wire connector 28, and out of the magnetic valve. In a most preferred embodiment, the insert 10 further comprises an electrically insulating flange 7, which flange 7 engages an outer perimeter of the open front end 12 of the metal housing 19 when the insert 10 is positioned within the open front end 12 of the magnetic valve 20. The insulating insert 10 of the present invention preferably prevents contact between the wires 22 and an inner surface of the metal housing 19 which may cause shorting or other electrical problems of the valve 20.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A magnetic valve assembly which comprises:
    a) a magnetic valve comprising:
        i) a metal housing having a top open end and a bottom closed end, an upper front hole through a front side of the metal housing near the top open end, and two opposing lower holes through opposite front and back sides of the metal housing near the bottom closed end;
        ii) a magnetic core having conductive connectors, and a central bore therethrough, which magnetic core is positioned within the bottom closed end of the metal housing such that the conductive connectors face in a direction towards the top open end of the metal housing, and that the central bore of the magnetic core is concentrically aligned with the two opposing lower holes through the opposite front and back sides of the metal housing;
        iii) a removable strain relief wire connector positioned through the upper front hole in the metal housing; and
        iv) conductive wires electrically attached to the conductive connectors of the magnetic core within the metal housing of the valve, which wires run through the strain relief wire connector and out of the magnetic valve; and
    b) an insulating insert comprising:
        i) a hollow, electrically insulating sleeve having sidewalls defining a top open end and a bottom open end opposite to the top open end; one of the side walls having a circular hole therethrough; and
        ii) a threaded bushing fixedly attached to the sidewall around the circular hole;
    which insert is positioned within the top open end of the magnetic valve such that the sidewalls of the electrically insulating sleeve are in contact with an inside surface of the metal housing, the strain relief wire connector engages the threaded bushing of the insulating insert within the magnetic valve such that a first end of the wire connector extends into the metal housing while a second end of the wire connector remains outside of the housing, and the conductive wires of the magnetic valve run from the conductive contacts, into the bottom open end of the insulating insert, through the wire connector, and out of the magnetic valve.

2. The magnetic valve of claim 1 wherein the insulating insert further comprises an electrically insulating covering in contact with the perimeter of the top open end of the sleeve.

3. The magnetic valve of claim 1 wherein the insulating insert further comprises an electrically insulating flange around a perimeter of the top open end of the sleeve, which flange projects substantially perpendicularly to said sidewalls, and which flange engages an outer perimeter of the open front end of the metal housing when the insert is positioned within the top open end of the magnetic valve.

4. The magnetic valve of claim 3 wherein the electrically insulating flange comprises a pair of opposing fastening holes therethrough.

5. The magnetic valve of claim 3, further comprises an electrically insulating covering in contact with the flange around the perimeter of the top open end of the sleeve.

6. A process for electrically insulating a magnetic valve which comprises:
   a) providing a magnetic valve comprising:
      i) a metal housing having a top open end and a bottom closed end, an upper front hole through a front side of the metal housing near the top open end, and two opposing lower holes through opposite front and back sides of the metal housing near the bottom closed end;
      ii) a magnetic core having conductive connectors, and a central bore therethrough, which magnetic core is positioned within the bottom closed end of the metal housing such that the conductive connectors face in a direction towards the top open end of the metal housing, and that the central bore of the magnetic core is concentrically aligned with the two opposing lower holes through the opposite front and back sides of the metal housing;
      iii) a removable strain relief wire connector positioned through the upper front hole in the metal housing; and
      iv) conductive wires electrically attached to the conductive connectors of the magnetic core within the metal housing of the valve, which wires run through the strain relief wire connector and out of the magnetic valve; and
   b) providing an insulating insert which comprises:
      i) a hollow, electrically insulating sleeve having sidewalls defining a top open end and a bottom open end opposite to the top open end; one of the side walls having a circular hole therethrough; and
      ii) a threaded bushing fixedly attached to the sidewall around the circular hole; and
   c) positioning the insulating insert within the top open end of the magnetic valve such that the sidewalls of the electrically insulating sleeve are in contact with an inside surface of the metal housing, the strain relief wire connector engages the threaded bushing of the insulating insert within the magnetic valve such that a first end of the wire connector extends into the metal housing while a second end of the wire connector remains outside of the housing, and the conductive wires of the magnetic valve run from the conductive contacts, into the bottom open end of the insulating insert, through the wire connector, and out of the magnetic valve.

7. The process of claim 6, wherein the insulating insert further comprises an electrically insulating covering in contact with the perimeter of the top open end of the sleeve.

8. The process of claim 6, wherein the electrically insulating sleeve and the threaded bushing each independently comprises an electrically insulating material selected from the group consisting of homopolymers and copolymers of polyesters, polyolefins, polyurethanes, nylons, polycarbonates, acrylonitrile, dienes, styrene, acrylics, rubbers, and combinations thereof.

9. The process of claim 6, wherein the insulating insert further comprises an electrically insulating flange around a perimeter of the top open end of the sleeve, which flange projects substantially perpendicularly to said sidewalls of the electrically insulating sleeve, and which flange engages an outer perimeter of the open front end of the metal housing when the insert is positioned within the top open end of the magnetic valve.

10. The process of claim 9 wherein the electrically insulating flange comprises a pair of opposing fastening holes therethrough.

11. The process of claim 9, wherein the electrically insulating insert further comprises an electrically insulating covering in contact with the flange around the perimeter of the top open end of the sleeve.

* * * * *